No. 778,342.

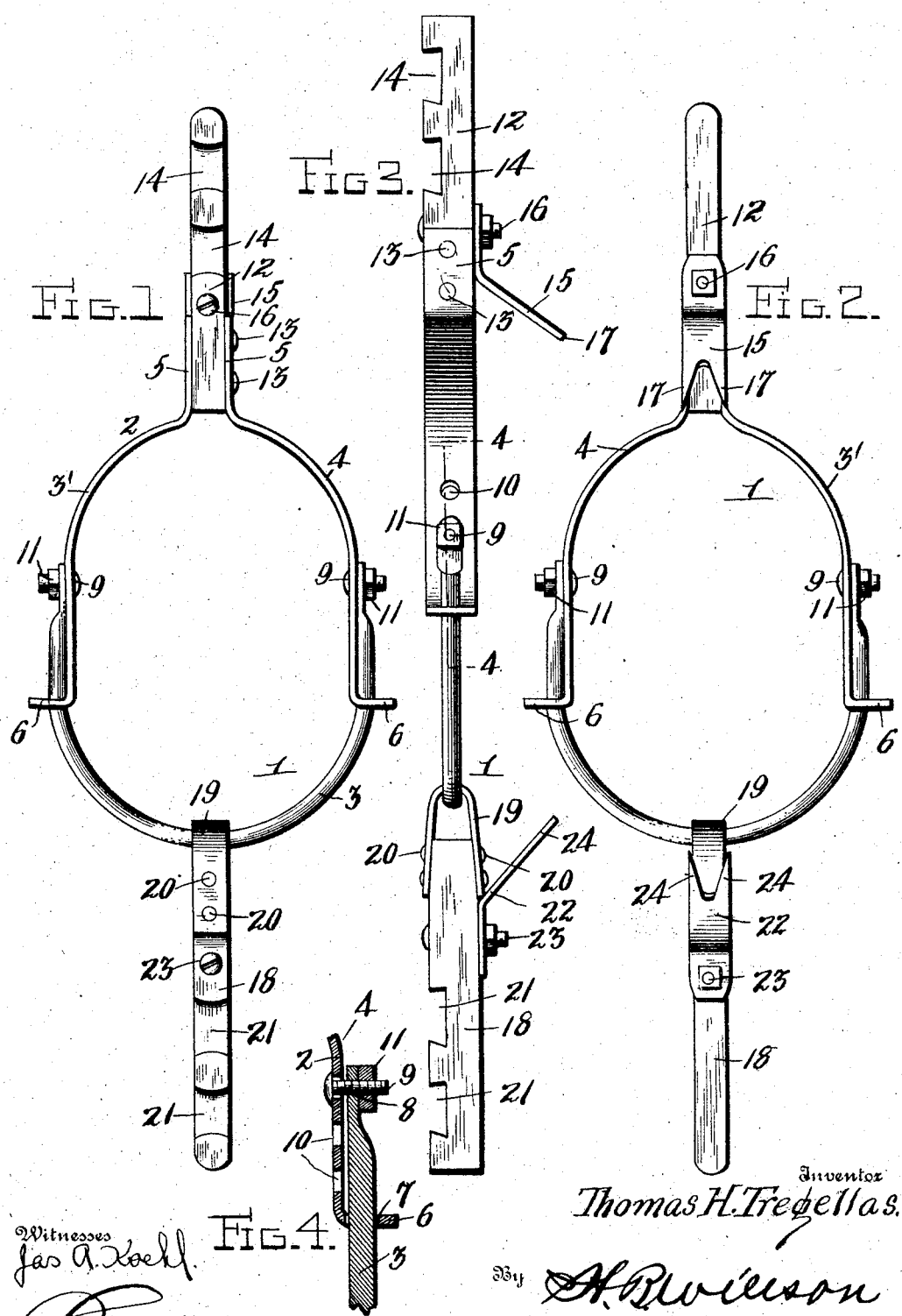

Patented December 27, 1904.

UNITED STATES PATENT OFFICE.

THOMAS H. TREGELLAS, OF IUKA, KANSAS.

ANIMAL-POKE.

SPECIFICATION forming part of Letters Patent No. 778,342, dated December 27, 1904.

Application filed March 17, 1904. Serial No. 198,639.

*To all whom it may concern:*

Be it known that I, THOMAS H. TREGELLAS, a citizen of the United States, residing at Iuka, in the county of Pratt and State of Kansas, have invented certain new and useful Improvements in Animal-Pokes; and I do declare the following to be a full, clear, and exact description of the invention, such as will enable others skilled in the art to which it appertains to make and use the same.

This invention relates to animal-pokes; and its object is to provide a poke which is adjustable for different-size animals, which will effectually prevent the animal from breaking through a fence, and which will prevent spreading of the fence-wires in the effort of the animal to obtain release.

The invention is illustrated in the accompanying drawings, in which—

Figure 1 is a front elevation of the device. Fig. 2 is a rear elevation. Fig. 3 is a side elevation, and Fig. 4 is a detail section taken on line 4 4 of Fig. 3.

Referring now more particularly to the drawings, the numeral 1 represents a yoke composed of upper and lower sections 2 and 3, the said upper section comprising two curved or segmental-shaped pieces 3' and 4 of metal, preferably strap metal, bent at their upper ends to form vertical attaching portions 5 and at their lower ends to form lateral or right-angularly projecting portions 6, which are apertured to provide eyes 7. The lower section 3 consists of a substantially semicircular or semi-elliptical rod or bar having its ends passed upwardly through the said eyes 7 and flattened and pierced to form eyes 8, adapted to receive bolts or similar fastenings 9, passing therethrough and through apertures 10 in the members 3' and 4 of the upper sections, said bolts carrying clamping-nuts 11. A plurality of these apertures 10 are provided in each of the pieces 3' and 4 of the upper yoke-section to enable the lower section 3 to be adjusted to adapt the yoke to fit the necks of animals of different sizes.

Between the attaching ends 5 of the members 3' and 4 of the upper sections 2 of the yoke enters the lower end of a bar 12, which is rigidly secured thereto by screws, bolts, or similar fastenings 13 and forms an upper guard or fender, the front surface of which is corrugated or formed with a series of notches or projections 14. This bar is provided at its rear with a pricker, consisting of an angularly-bent piece of sheet metal 15, secured thereto by a bolt 16 and provided at its free end with spurs 17.

The lower section 3 of the yoke has pivoted thereto a swinging bar 18, which bar is pivotally secured thereto by means of a U-shaped strap 19, which strap receives the upper end of the bar, which is secured thereto by rivets or like fastenings 20. The front surface of the bar 18 is provided with grooves or projections 21, corresponding to those of the upper fixed bar, the said two sets of grooves or projections of the two bars serving to engage the line-wires of a fence to prevent the same from spreading when the animal attempts to break therethrough. The bar 18 is also provided with a pricker 22, formed of an angular piece of metal secured thereto by a bolt 23 and provided at its free end with members 24.

In operation the device is adjusted upon the neck of the animal with the upper pricking device arranged so as to lightly engage the upper surface of the neck, and the bar 18 hangs downward and when the animal is grazing slides along the surface of the ground, the yoke by the inclination of the neck of the animal assuming such a position that the grazing of the animal will not be interfered with by the prickers. When, however, the animal attempts to pass its head and neck through the fence, the two bars engage the line-wires of the fence, and the bar 18 is thereby swung backwardly, this action causing the yoke to tilt rearwardly and the prickers of the two bars to engage the upper and lower sections of the neck, thus pricking the animal a sufficient extent to deter it from further attempts to pass through. As before stated, the notches or projections of the two bars also engage the wires and prevent the same from spreading at the same time.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

An animal-poke comprising a yoke formed of sections, the upper section consisting of segmental pieces having lateral eyes at their lower ends, and the lower section having ends projecting through said eyes, fastenings adjustably connecting the ends of the lower section to the pieces of the upper section, a bar fixed to the upper ends of the pieces of the upper section, a bar pivoted to the lower section, and prickers carried by said bars, substantially as described.

In testimony whereof I have hereunto set my hand in presence of two subscribing witnesses.

THOMAS H. TREGELLAS.

Witnesses:
W. J. MUNGER,
W. R. NARON.